US012670504B2

(12) United States Patent
Savarese

(10) Patent No.: US 12,670,504 B2
(45) Date of Patent: Jun. 30, 2026

(54) SYSTEM AND METHOD OF AUTHENTICATING PHYSICAL COLLECTIBLES

(71) Applicant: Genuine Inc., San Ramon, CA (US)

(72) Inventor: Chris Savarese, Danville, CA (US)

(73) Assignee: Genuine Inc., San Ramon, CA (US)

( * ) Notice: Subject to any disclaimer, the term of this patent is extended or adjusted under 35 U.S.C. 154(b) by 152 days.

(21) Appl. No.: 18/202,210

(22) Filed: May 25, 2023

(65) Prior Publication Data

US 2023/0385850 A1 Nov. 30, 2023

Related U.S. Application Data

(60) Provisional application No. 63/460,565, filed on Apr. 19, 2023, provisional application No. 63/426,843, filed on Nov. 21, 2022, provisional application No. 63/347,507, filed on May 31, 2022.

(51) Int. Cl.
| | |
|---|---|
| *G06Q 30/018* | (2023.01) |
| *G06Q 10/087* | (2023.01) |
| *G06Q 10/10* | (2023.01) |
| *G06Q 30/02* | (2023.01) |
| *G06Q 30/06* | (2023.01) |

(52) U.S. Cl.
CPC .................................. *G06Q 30/0185* (2013.01)

(58) Field of Classification Search
CPC .......................... G06Q 30/0185; G06Q 30/018
USPC .................................................. 705/1.1–912
See application file for complete search history.

(56) References Cited

U.S. PATENT DOCUMENTS

| | | | |
|---|---|---|---|
| 5,963,134 A | 10/1999 | Bowers et al. | |
| 6,591,252 B1 | 7/2003 | Young | |
| 6,681,990 B2 | 1/2004 | Vogler et al. | |
| 6,691,916 B2 * | 2/2004 | Noyes | G06V 40/30 |
| | | | 235/382 |
| 6,839,453 B1 * | 1/2005 | McWilliam | G06V 40/30 |
| | | | 340/5.82 |
| 7,131,581 B2 * | 11/2006 | Shaw | G07C 1/22 |
| | | | 235/487 |
| 7,840,453 B2 | 11/2010 | Davis, Jr. et al. | |
| 7,841,513 B1 * | 11/2010 | Katzer | G06Q 10/00 |
| | | | 340/572.1 |
| 8,234,185 B2 | 7/2012 | Davis | |
| 8,325,969 B2 * | 12/2012 | Simske | G06T 1/0071 |
| | | | 382/100 |
| 8,370,225 B2 | 2/2013 | Davis, Jr. et al. | |
| 8,898,077 B2 | 11/2014 | Davis, Jr. | |
| 9,082,124 B2 | 7/2015 | Davis, Jr. | |

(Continued)

FOREIGN PATENT DOCUMENTS

EP 0957459 A1 11/1999

*Primary Examiner* — Jonathan P Ouellette
(74) *Attorney, Agent, or Firm* — WOMBLE BOND DICKINSON (US) LLP

(57) ABSTRACT

A system and method authenticates physical collectibles. A user of a mobile device is authenticated. An image of a physical item during a session is captured by the mobile device. Session data representing presence of the mobile device and the user at the session is captured. The session data includes one or more of user image data, user audio data, time data, or location data. Based on the session data, a unique code is generated. The unique code is associated with the physical item. Other embodiments are described and claimed.

20 Claims, 16 Drawing Sheets

(56)                References Cited

U.S. PATENT DOCUMENTS

| | | | |
|---|---|---|---|
| 9,280,876 B2 | 3/2016 | Alvi et al. | |
| 9,652,938 B2 | 5/2017 | Alvi et al. | |
| 10,049,365 B2 | 8/2018 | Davis, Jr. et al. | |
| 10,217,324 B2 | 2/2019 | Alvi et al. | |
| 10,229,384 B2 | 3/2019 | Davis, Jr. | |
| 10,348,505 B1 | 7/2019 | Crawforth et al. | |
| 10,355,865 B1 | 7/2019 | Crawforth et al. | |
| 10,560,261 B1 | 2/2020 | Crawforth et al. | |
| 10,853,456 B1 | 12/2020 | Crawforth et al. | |
| 11,055,384 B1 | 7/2021 | Crawforth et al. | |
| 11,163,855 B1 | 11/2021 | Crawforth et al. | |
| 12,056,561 B1 | 8/2024 | Manchi et al. | |
| 12,217,261 B2* | 2/2025 | Copeland | G06Q 20/401 |
| 2002/0118394 A1* | 8/2002 | Mckinley | G06Q 30/0236 |
| | | | 358/3.28 |
| 2002/0178363 A1* | 11/2002 | Ambrogio | G07D 7/004 |
| | | | 713/176 |
| 2003/0046543 A1* | 3/2003 | Houston | H04L 63/126 |
| | | | 713/176 |
| 2003/0191694 A1* | 10/2003 | Vonfeldt | G06Q 30/0601 |
| | | | 705/26.1 |
| 2003/0220885 A1 | 11/2003 | Lucarelli et al. | |
| 2004/0093497 A1 | 5/2004 | Arangio | |
| 2004/0140349 A1 | 7/2004 | Shaw | |
| 2005/0289061 A1* | 12/2005 | Kulakowski | G06Q 99/00 |
| | | | 705/50 |
| 2007/0155510 A1* | 7/2007 | Galvin | G11B 20/00086 |
| | | | 463/43 |
| 2015/0072763 A1 | 3/2015 | Alvi et al. | |
| 2018/0154221 A1 | 6/2018 | Alvi | |
| 2018/0253681 A1 | 9/2018 | Stiefel et al. | |
| 2018/0349839 A1 | 12/2018 | Davis, Jr. et al. | |
| 2019/0081947 A1 | 3/2019 | Faris et al. | |
| 2019/0188970 A1 | 6/2019 | Alvi et al. | |
| 2019/0205824 A1 | 7/2019 | Davis, Jr. | |
| 2023/0089680 A1* | 3/2023 | Zabetian | G06Q 30/0185 |
| | | | 705/403 |
| 2023/0351412 A1* | 11/2023 | Tanaka | G06Q 30/0185 |
| 2024/0354393 A1 | 10/2024 | Savarese | |
| 2025/0061470 A1* | 2/2025 | Chen | G06Q 30/0185 |

* cited by examiner

100

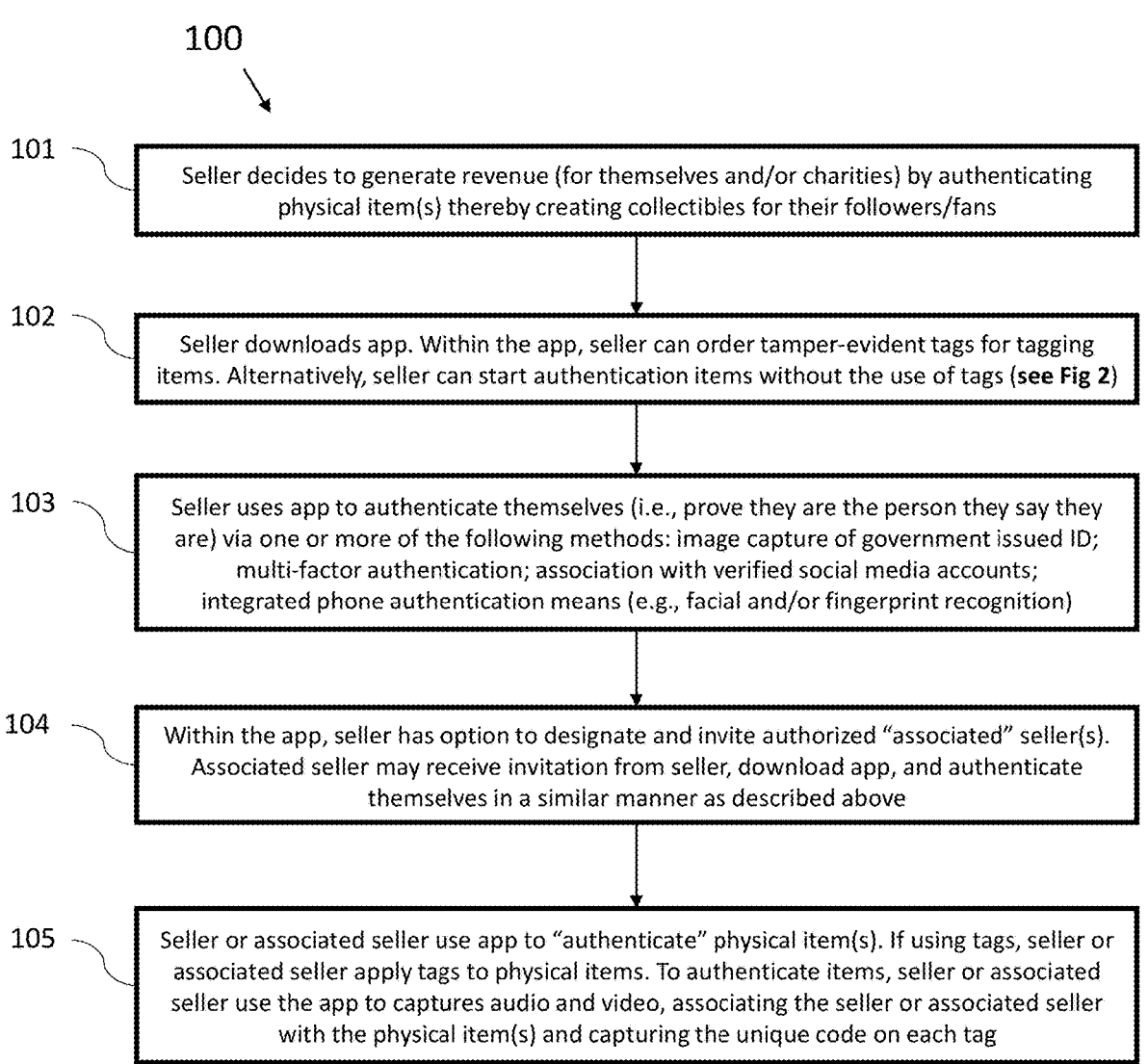

101 — Seller decides to generate revenue (for themselves and/or charities) by authenticating physical item(s) thereby creating collectibles for their followers/fans 102 — Seller downloads app. Within the app, seller can order tamper-evident tags for tagging items. Alternatively, seller can start authentication items without the use of tags (see Fig 2)

103 — Seller uses app to authenticate themselves (i.e., prove they are the person they say they are) via one or more of the following methods: image capture of government issued ID; multi-factor authentication; association with verified social media accounts; integrated phone authentication means (e.g., facial and/or fingerprint recognition)

104 — Within the app, seller has option to designate and invite authorized "associated" seller(s). Associated seller may receive invitation from seller, download app, and authenticate themselves in a similar manner as described above 105 — Seller or associated seller use app to "authenticate" physical item(s). If using tags, seller or associated seller apply tags to physical items. To authenticate items, seller or associated seller use the app to captures audio and video, associating the seller or associated seller with the physical item(s) and capturing the unique code on each tag

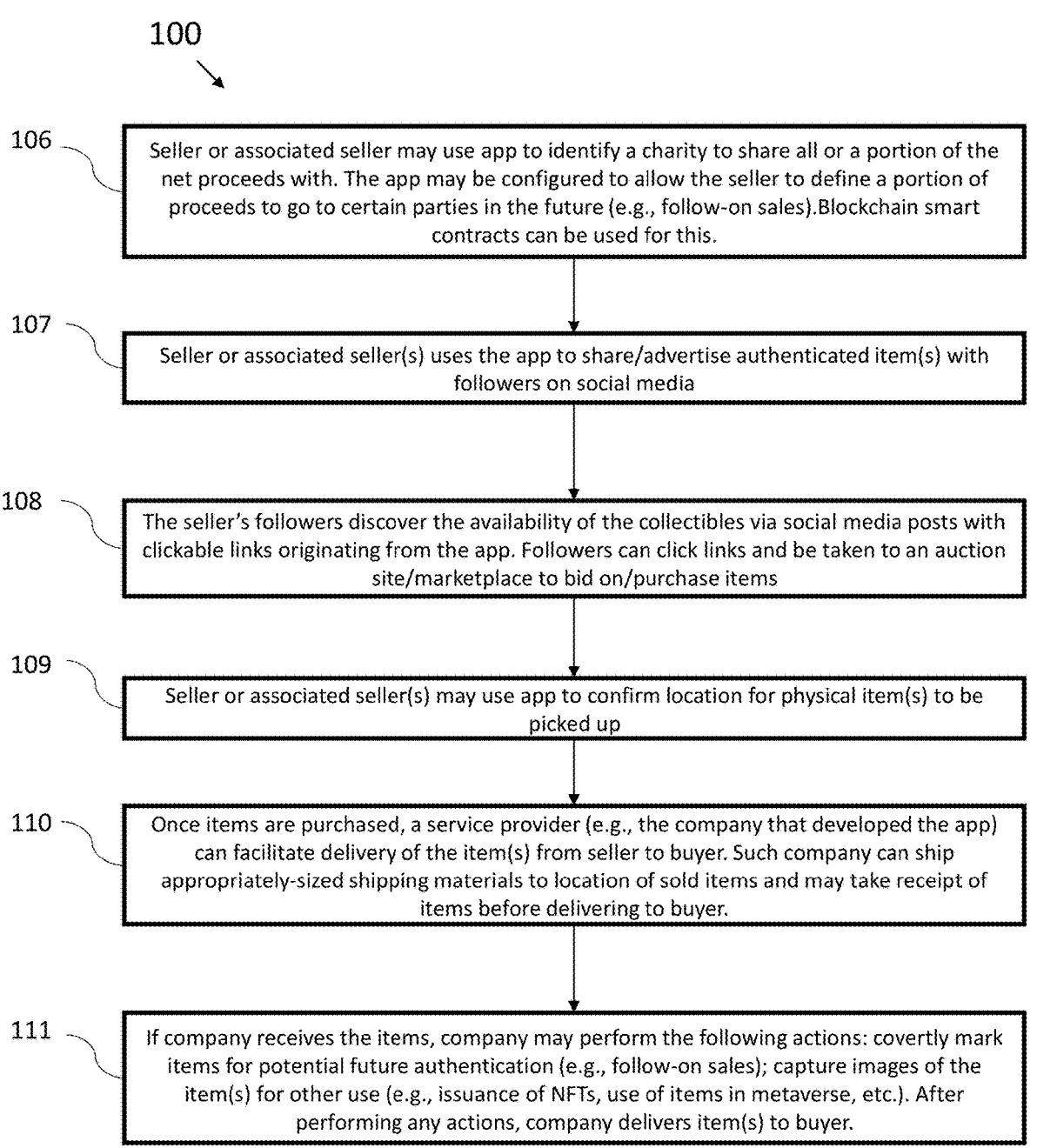

106 — Seller or associated seller may use app to identify a charity to share all or a portion of the net proceeds with. The app may be configured to allow the seller to define a portion of proceeds to go to certain parties in the future (e.g., follow-on sales).Blockchain smart contracts can be used for this.

107 — Seller or associated seller(s) uses the app to share/advertise authenticated item(s) with followers on social media 108 — The seller's followers discover the availability of the collectibles via social media posts with clickable links originating from the app. Followers can click links and be taken to an auction site/marketplace to bid on/purchase items 109 — Seller or associated seller(s) may use app to confirm location for physical item(s) to be picked up 110 — Once items are purchased, a service provider (e.g., the company that developed the app) can facilitate delivery of the item(s) from seller to buyer. Such company can ship appropriately-sized shipping materials to location of sold items and may take receipt of items before delivering to buyer.

111 — If company receives the items, company may perform the following actions: covertly mark items for potential future authentication (e.g., follow-on sales); capture images of the item(s) for other use (e.g., issuance of NFTs, use of items in metaverse, etc.). After performing any actions, company delivers item(s) to buyer.

FIG. 1 (CONT'D.)

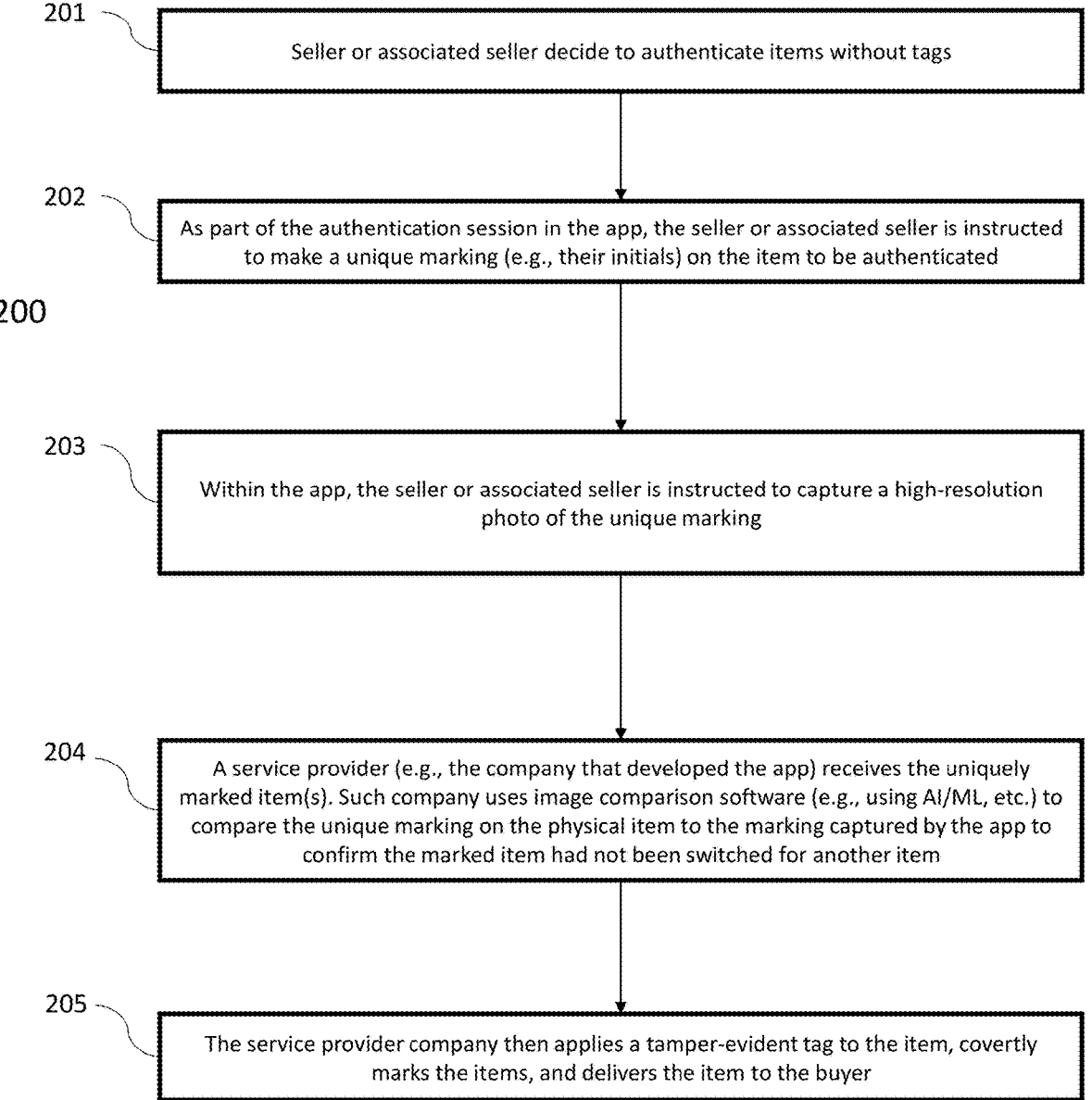

201 Seller or associated seller decide to authenticate items without tags

200

202 As part of the authentication session in the app, the seller or associated seller is instructed to make a unique marking (e.g., their initials) on the item to be authenticated 203 Within the app, the seller or associated seller is instructed to capture a high-resolution photo of the unique marking 204 A service provider (e.g., the company that developed the app) receives the uniquely marked item(s). Such company uses image comparison software (e.g., using AI/ML, etc.) to compare the unique marking on the physical item to the marking captured by the app to confirm the marked item had not been switched for another item 205 The service provider company then applies a tamper-evident tag to the item, covertly marks the items, and delivers the item to the buyer

FIG. 2

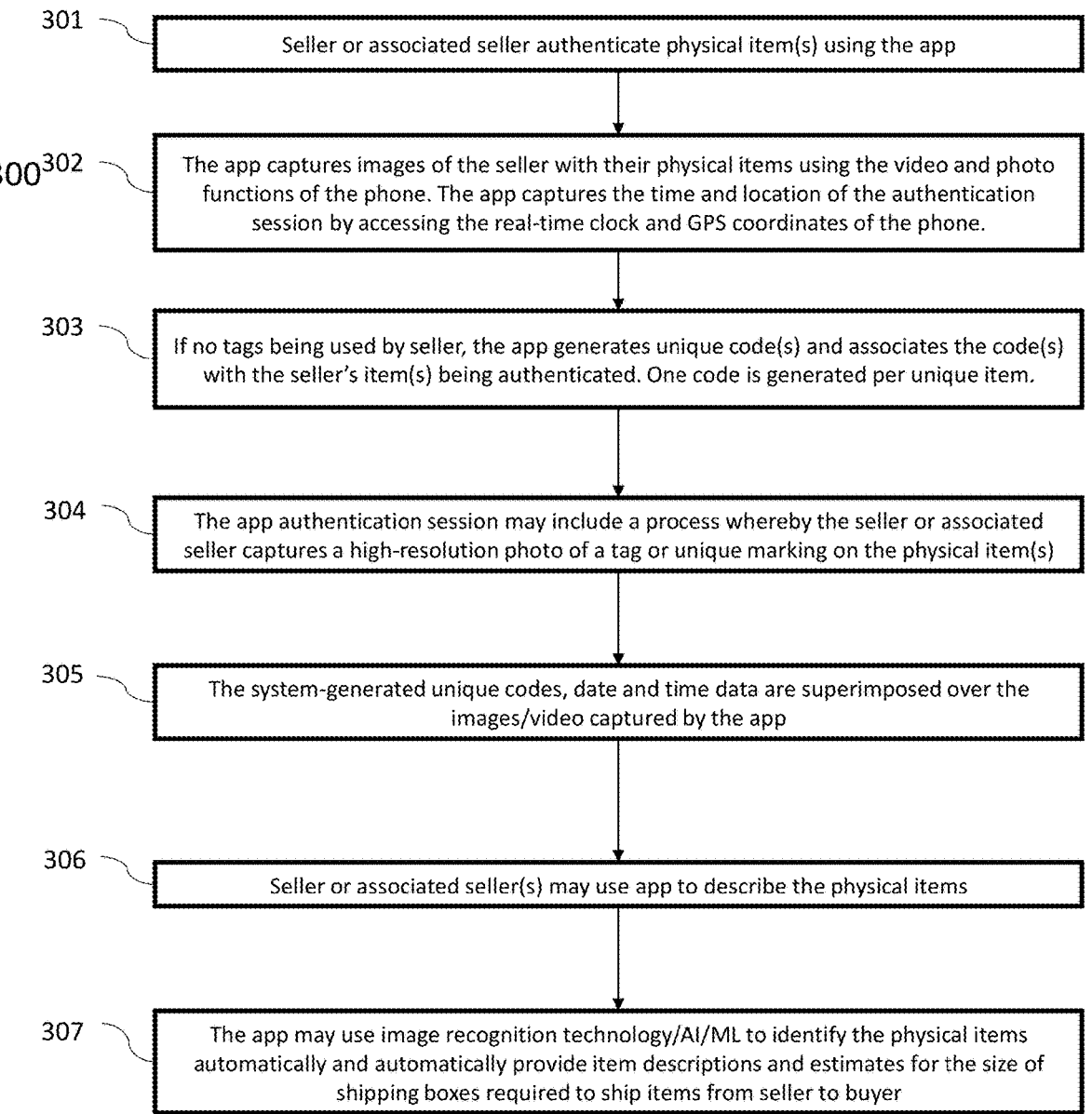

301 — Seller or associated seller authenticate physical item(s) using the app 300 302 — The app captures images of the seller with their physical items using the video and photo functions of the phone. The app captures the time and location of the authentication session by accessing the real-time clock and GPS coordinates of the phone.

303 — If no tags being used by seller, the app generates unique code(s) and associates the code(s) with the seller's item(s) being authenticated. One code is generated per unique item.

304 — The app authentication session may include a process whereby the seller or associated seller captures a high-resolution photo of a tag or unique marking on the physical item(s)

305 — The system-generated unique codes, date and time data are superimposed over the images/video captured by the app 306 — Seller or associated seller(s) may use app to describe the physical items 307 — The app may use image recognition technology/AI/ML to identify the physical items automatically and automatically provide item descriptions and estimates for the size of shipping boxes required to ship items from seller to buyer

FIG. 3

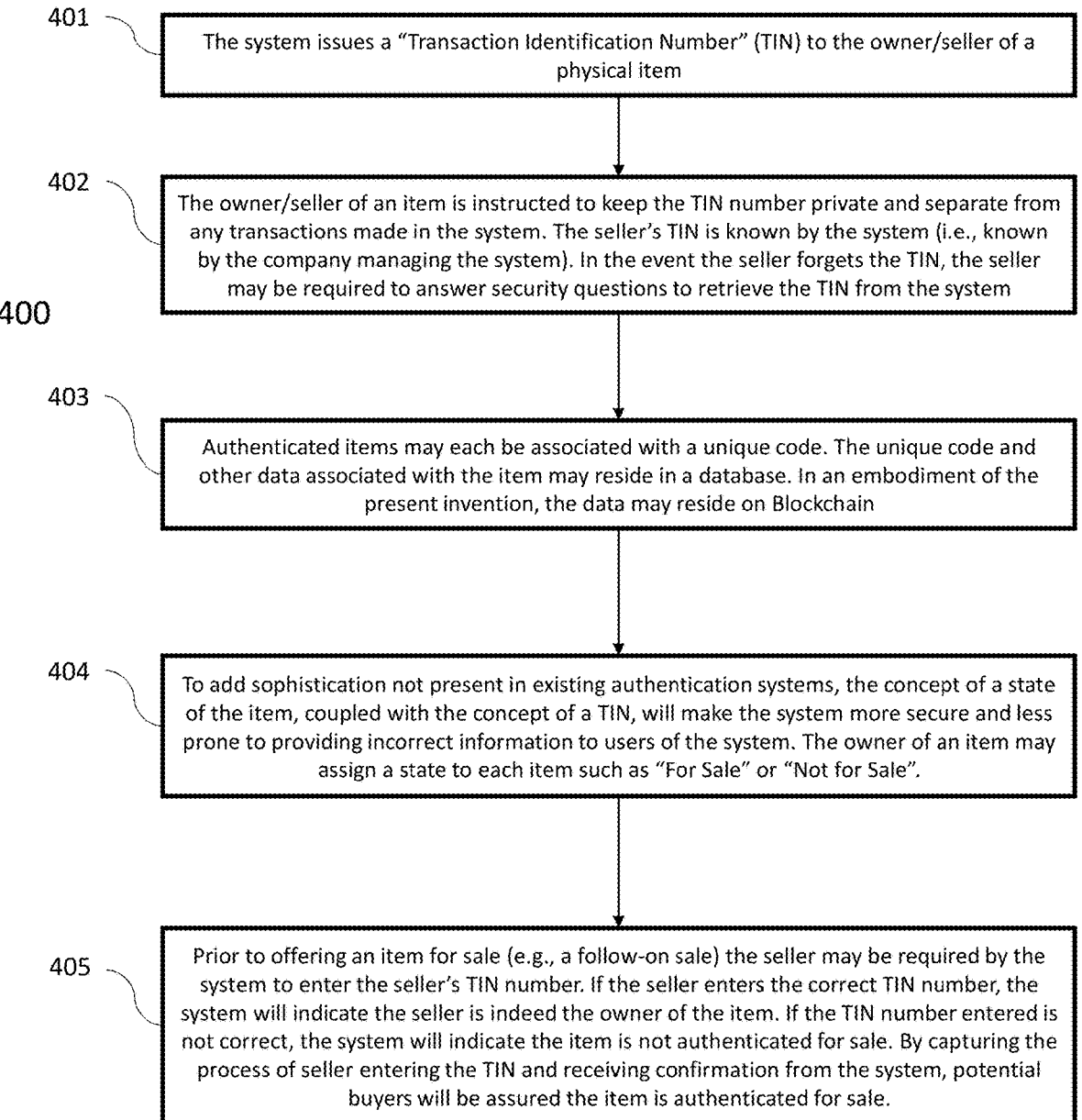

401 — The system issues a "Transaction Identification Number" (TIN) to the owner/seller of a physical item 402 — The owner/seller of an item is instructed to keep the TIN number private and separate from any transactions made in the system. The seller's TIN is known by the system (i.e., known by the company managing the system). In the event the seller forgets the TIN, the seller may be required to answer security questions to retrieve the TIN from the system

400

403 — Authenticated items may each be associated with a unique code. The unique code and other data associated with the item may reside in a database. In an embodiment of the present invention, the data may reside on Blockchain 404 — To add sophistication not present in existing authentication systems, the concept of a state of the item, coupled with the concept of a TIN, will make the system more secure and less prone to providing incorrect information to users of the system. The owner of an item may assign a state to each item such as "For Sale" or "Not for Sale".

405 — Prior to offering an item for sale (e.g., a follow-on sale) the seller may be required by the system to enter the seller's TIN number. If the seller enters the correct TIN number, the system will indicate the seller is indeed the owner of the item. If the TIN number entered is not correct, the system will indicate the item is not authenticated for sale. By capturing the process of seller entering the TIN and receiving confirmation from the system, potential buyers will be assured the item is authenticated for sale.

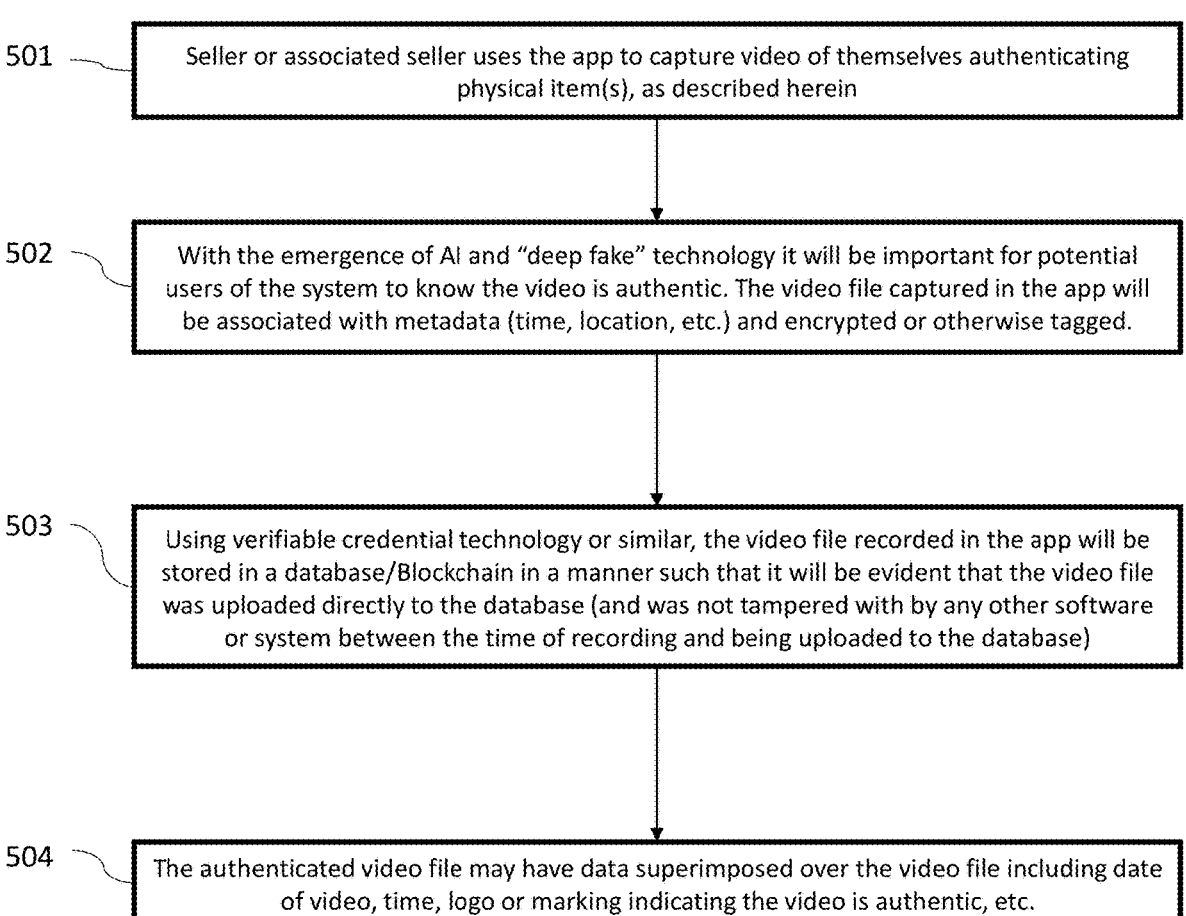

501 — Seller or associated seller uses the app to capture video of themselves authenticating physical item(s), as described herein 502 — With the emergence of AI and "deep fake" technology it will be important for potential users of the system to know the video is authentic. The video file captured in the app will be associated with metadata (time, location, etc.) and encrypted or otherwise tagged.

503 — Using verifiable credential technology or similar, the video file recorded in the app will be stored in a database/Blockchain in a manner such that it will be evident that the video file was uploaded directly to the database (and was not tampered with by any other software or system between the time of recording and being uploaded to the database)

504 — The authenticated video file may have data superimposed over the video file including date of video, time, logo or marking indicating the video is authentic, etc.

FIG. 5

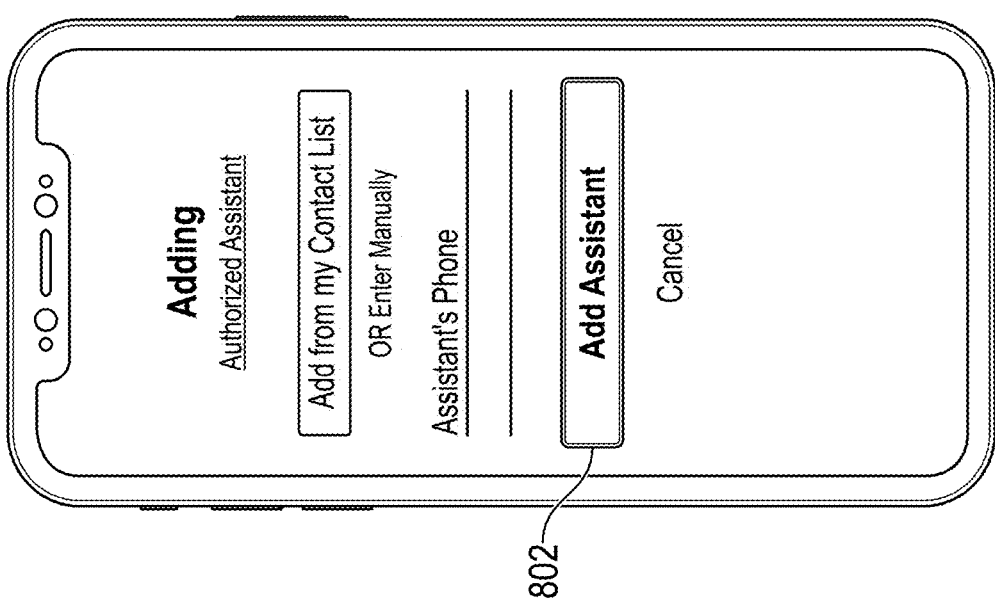
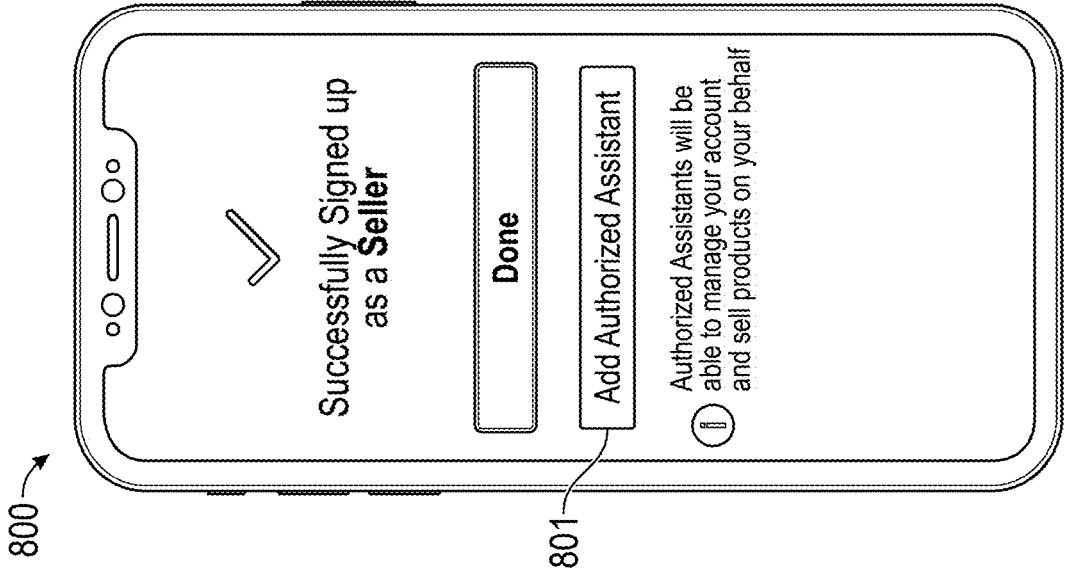
FIG. 8

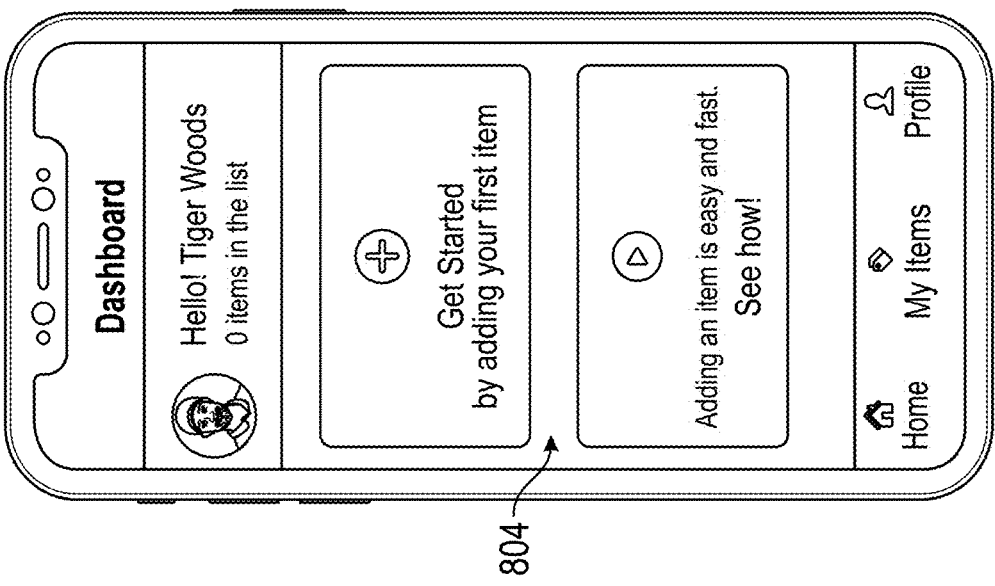
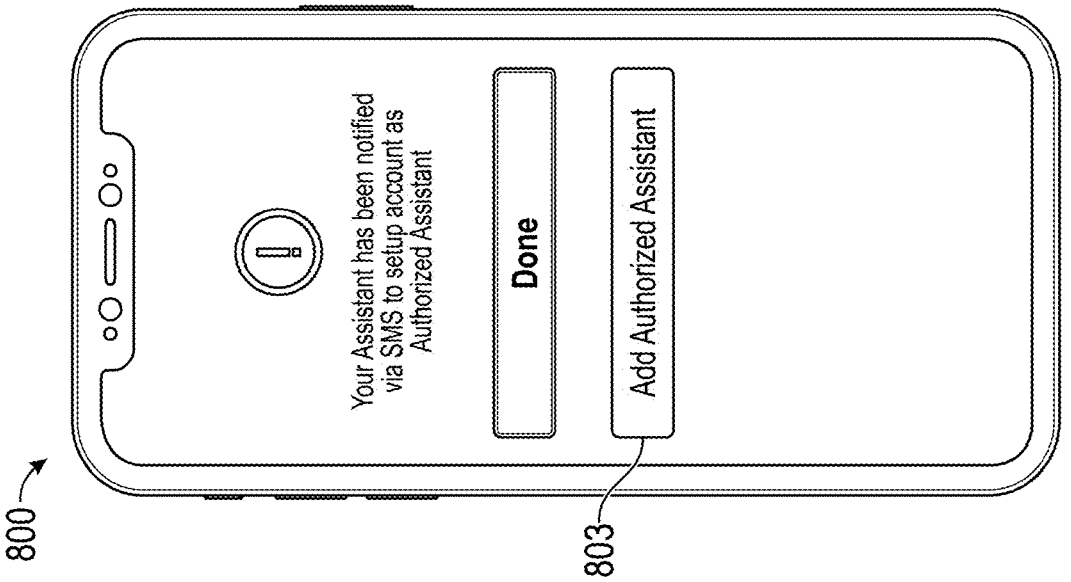
FIG. 8
(Continued)

1100

1101

SYSTEM AND METHOD OF AUTHENTICATING PHYSICAL COLLECTIBLES

This application claims the benefit of U.S. Provisional Application No. 63/460,565, filed on Apr. 19, 2023, and U.S. Provisional Application No. 63/426,843, filed on Nov. 21, 2022, and U.S. Provisional Application No. 63/347,507, filed on May 31, 2022, the entire disclosures of which are incorporated herein by reference.

FIELD OF THE INVENTION

The invention relates to collectibles, and more particularly to physical collectibles, and systems and methods related to the authentication of collectibles and discovery, digital replication, and distribution of collectibles.

BACKGROUND OF THE INVENTION

Fraud is a significant problem in the world of physical collectibles. The industry relies on unsophisticated solutions—including paper certificates of authenticity, database structures that provide inaccurate authenticity information, holograms stickers that can be forged, and the imperfect and unreliable practice of "photo matching." For example, in sports, Major League Baseball is viewed as a gold standard in authentication. MLB's program is more than 22 years old, is labor-intensive, and the database often provides inaccurate information (i.e., the MLB database lacks the sophistication necessary to inform a consumer if they are in possession of an authentic collectible or one that has been forged). Additionally, it is common practice to rely on third-party services to authenticate physical collectibles.

SUMMARY OF THE DESCRIPTION

Apparatuses and methods relating to the authentication of physical items are described herein.

A system, method, and non-transitory computer-readable medium is provided. The method includes authenticating, by one or more processors of a mobile device, a user of the mobile device. The method includes capturing, by one or more cameras of the mobile device, an image of a physical item during a session. The method includes generating, by the one or more processors, session data representing presence of the mobile device and the user during the session. The session data includes one or more of user image data, user audio data, time data, or location data. The method includes generating, by the one or more processors based on the session data, a unique code associated with the physical item.

The system includes the mobile device, e.g., the one or more processors, a memory, and/or a display configured to perform the method and operations described below.

The non-transitory computer-readable medium stores instructions, which when executed by the one or more processors of the system, cause the system to perform the method.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The present invention is illustrated by way of example and not limitation in the figures of the accompanying drawings in which like references indicate similar elements.

FIG. 1 shows a flowchart of a method of authenticating physical collectibles, including discovery (seller advertising directly to followers) and distribution of the physical collectibles, in accordance with an embodiment.

FIG. 2 shows a flowchart of a method of authenticating physical collectibles whereby the seller can mark the physical collectibles rather than affix/couple physical tags to the physical collectibles, in accordance with an embodiment.

FIG. 3 shows a flowchart of a software application for authenticating physical collectibles, in accordance with an embodiment.

FIG. 4 shows a flowchart of a method of authenticating physical items using a Transaction Identification Number (TIN), in accordance with an embodiment.

FIG. 5 shows a flowchart of a software application for authenticating physical collectibles, whereby the software application produces a data-rich video file, such file including superimposed metadata about the authentication session, in accordance with an embodiment.

FIG. 8 shows example screenshots of a software application used for authenticating physical collectibles, highlighting an embodiment of a process whereby a seller can authorize other individuals to act on seller's behalf to authenticate physical collectibles.

DETAILED DESCRIPTION

Figure 6:
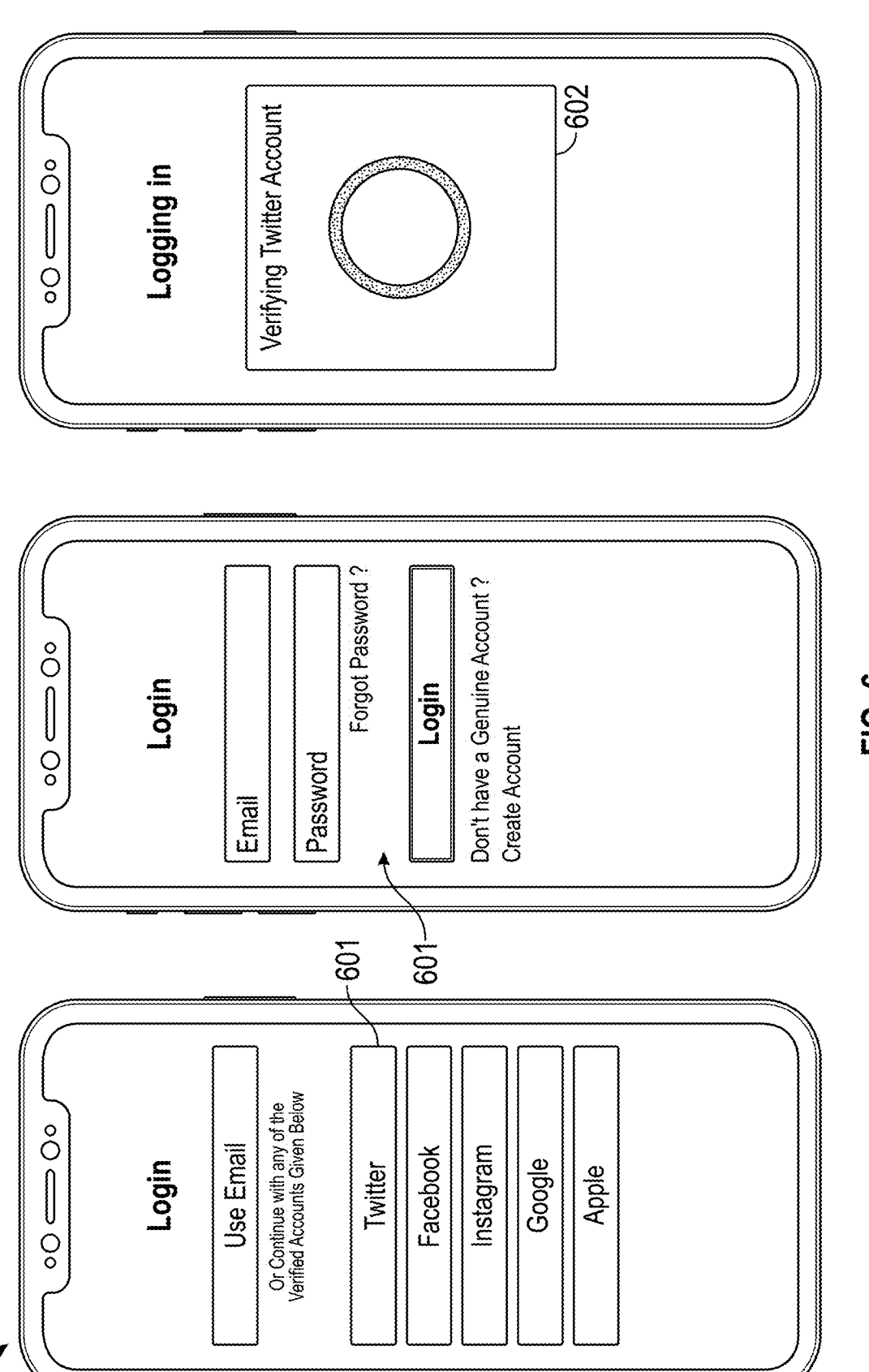
FIG. 6 shows example screenshots of a software application used for authenticating physical collectibles, highlighting an embodiment of a process whereby a seller uses verified public information as a potential means of verifying seller's identity.

Various embodiments and aspects will be described with reference to details set below, and the accompanying drawings will illustrate the embodiments. The following description and drawings are illustrative and are not to be construed as limiting the invention. Numerous specific details are described to provide a thorough understanding of various embodiments. However, in certain instances, well-known or conventional details are not described in order to not unnecessarily obscure the present invention in detail.

FIG. 1 shows a process flow chart 100. In step 101, a seller or seller's authorized assistant (hereinafter described as "seller") decides to generate revenue by authenticating and selling a physical item. In step 102, a seller downloads a software application (hereinafter an "app") and orders tamper-evident tags for authentication physical items. A seller uses an app to create an account and verify their identity. This can be accomplished using various methods, per 103, and the more methods used, the better the verification. In one embodiment, a seller uses the following methods in an app to verify their identity: Scanning seller's government-issued identification; muti-factor authentication, association of an app with verified public accounts (e.g., a verified Twitter account); integrated verification in the phone (e.g., fingerprint recognition, facial recognition software, etc.).

Per step 104, a seller may designate authorized sellers to authenticate items on seller's behalf. The app facilities the process of seller inviting authorized agents. Upon accepting an invitation to be an authorized assistant, the authorized assistant is required to validate their identity using similar means to seller validation. The app facilitates the creation of an "authentication session" per 105 which involves the following: seller affixes physical tags to physical items. Note: each tamper-evident tag includes a unique identification number. The seller creates a video file (with audio). The video captures the following: the seller, a system-generated unique code, a description of the physical item(s) being authenticated, and metadata describing the session (e.g., date, time, location, etc. from the phone). The session can occur during a public event, such as a sporting event, or a private event, such as an authentication session performed in a user's residence. The session is a time-bound occurrence during which the authentication is performed. As part of the authentication session, the seller is instructed to capture a high-resolution image of the coded tag. If more than one item is authenticated in a session, the app instructs the seller to capture each coded tag—affixed to the physical items—in a high-resolution photo.

The app provides the seller with the ability to allocate the proceeds from a sale of authenticated collectibles, per step 106. In an embodiment, the seller can define that all net proceeds from sale go to a charity. In an embodiment, Blockchain technology is used to store the data-rich video asset (NFT) resulting from an authentication session in the app. This video asset can serve as a digital certificate of authenticity. Further, this video asset can facilitate ownership tracking. Like a deed for a house or a pink slip for a car, when the ownership of a physical collectible changes (for example from User123 to User456), the video asset (NFT) is also transferred from User123 to User456. In an embodiment, a third party (e.g., the maker of the authentication app) may act as an intermediary and hold items until payment is made from buyer to seller and tracking NFT is transferred from seller to buyer. In an embodiment, smart contract technology is used to automatically allocate proceeds from follow-on sales to predetermined parties.

The software application is configured to facilitate the advertising of authenticated items directly from seller to seller's fans/followers by allowing the seller to select social media accounts seller intends to advertise on. When the seller finishes authenticating an item, the seller can select one or more of the seller's social media accounts and the app will send information to the social media accounts, alerting followers of the seller's social media accounts that items are available for sale, per steps 107 and 108.

Per step 109, the app is, in one embodiment, configured to allow the seller to enter the location of the authenticated item for pickup and delivery to seller. In one embodiment, per step 110, a third party (e.g., the maker of the authentication app) may deliver shipping materials to the location of the authenticated items. These shipping materials may be appropriately sized by information gathered by the app. In one embodiment of a process, the third party described herein may receive the authenticated items before delivering such items to the buyer. Per step 111, in one embodiment of a process, the third party described herein may receive the authenticated items and perform the following actions on the authenticated items before delivering to the buyer: covertly mark the item(s) for future authentication (e.g., follow-on sales); digitally replicate the item(s) for other uses (e.g., issuance of collectible digital NFTs, use of items in metaverse, etc.).

FIG. 2 shows a flowchart 200 describing the process of DIY authentication for physical collectibles whereby the seller can simply mark the physical collectibles rather than affix/couple physical tags to the physical collectibles. In step 201, a seller may decide to authenticate items by simply downloading the app and following the instructions to authenticate physical items without the need for tags. Alternatively, the seller will be presented with the option to order tags from within the app. If the seller proceeds to authenticate without tags, per step 202, the seller is instructed to make a unique marking (e.g., their initials) on the item to be authenticated. Per step 203, within the app, the seller is instructed to capture a high-resolution photo of the unique marking. In an embodiment, as outlined in step 204, a service provider (e.g., the company that developed the app) receives the uniquely marked item(s). In an embodiment of a process, such company uses image comparison software (e.g., using AI/ML, etc.) to compare the unique marking on the physical item to the marking captured by the app to confirm the marked item had not been switched for another item. Per step 205, in an embodiment of a process, the service provider company then applies a tamper-evident tag to the item, covertly marks the items, and delivers the item to the buyer.

FIG. 3 shows a flowchart 300 describing various details relating to a software application. In step 301, a seller authenticates physical item(s) using the app. In step 302, the app captures images of the seller with their physical items using the video and photo functions of the phone. The app captures the time and location of the authentication session by accessing the real-time clock and GPS coordinates of the phone.

Per step 303, if no tags are being used by the seller, the app generates unique code(s) and associates the code(s) with the seller's item(s) being authenticated. One code is generated per unique item. These unique codes are displayed on the screen within the app. In an embodiment, the unique codes are superimposed over the images being recorded and the app is configured to associate a new code with each new item authenticated by the seller. Per step 304, the app authentication session may include a process whereby the seller or captures a high-resolution photo of a tag or unique marking on the physical item(s). Per step 305, the system-generated unique codes, date, and time data are superimposed over the images/video captured by the app. Per step 306, a seller or may use app to describe the physical items being authenticated. Per step 307, the app may use image recognition technology/artificial intelligence/machine learning to identify the physical items automatically and automatically provide item descriptions and estimates for the size of shipping boxes required to ship items from seller to buyer.

FIG. 4 shows a flowchart 400 describing the process of authenticating physical items including the concept of a Transaction Identification Number (TIN). In step 401, the system issues a "Transaction Identification Number" (TIN) to the owner/seller of a physical item. In step 402, a seller of an item is instructed to keep the TIN number private and separate from any transactions made in the system. The seller's TIN is known by the system (i.e., known by the company managing the system). In the event the seller forgets the TIN, the seller may be required to answer security questions to retrieve the TIN from the system. Per step 403, authenticated items may each be associated with a unique code. The unique code and other data associated with the item may reside in a database. In an embodiment of the present invention, the data may reside on Blockchain. Per step 404, to add sophistication not found in existing authentication systems, the concept of a state of an item, coupled with the concept of a TIN, will make the system more secure and less prone to providing incorrect information to users of the system. The owner of an item may assign a state to each item such as "For Sale" or "Not for Sale". Per step 405, prior to offering an item for sale (e.g., a follow-on sale) the seller may be required by the system to enter the seller's TIN number. If the seller enters the correct TIN number, the system will indicate the seller is indeed the owner of the item. If the TIN number entered is not correct, the system will indicate the item is not authenticated for sale. By capturing the process of seller entering the TIN and receiving confirmation from the system, potential buyers will be assured the item is authenticated for sale.

FIG. 5 shows a flowchart 500 describing an embodiment of a software application, whereby the app produces a data-rich video file, such file including superimposed metadata about the authentication session. The video file may be encrypted or use verifiable credential and Blockchain technology to prevent the potential of fraudulent "deepfake" videos being used. In step 501, a seller uses the app to capture video of themselves authenticating physical item(s), as described herein. Per step 502, with the emergence of AI and "deepfake" technology, it will be important for potential users of the system to know the video is authentic. The video file captured in the app may be associated with metadata (time, location, etc.) and may be encrypted or otherwise tagged. Per step 503, using verifiable credential technology or similar, the video file recorded in the app will be stored in a database/Blockchain in a manner such that it will be evident that the video file was uploaded directly to the database (and was not tampered with by any other software or system between the time of recording and being uploaded to the database). Per step 504, the authenticated video file may have data superimposed over the video file including date of video, time, logo or marking indicating the video is authentic, etc.

FIG. 6 shows example screenshots 600 of a software application, highlighting an embodiment of a process whereby a seller uses verified public information as a potential means of verifying seller's identity. In an embodiment, the authentication app can be coupled to one or more of a seller's verified public accounts. For example, a verified Twitter account as shown by 601 and 602.

Figure 7:
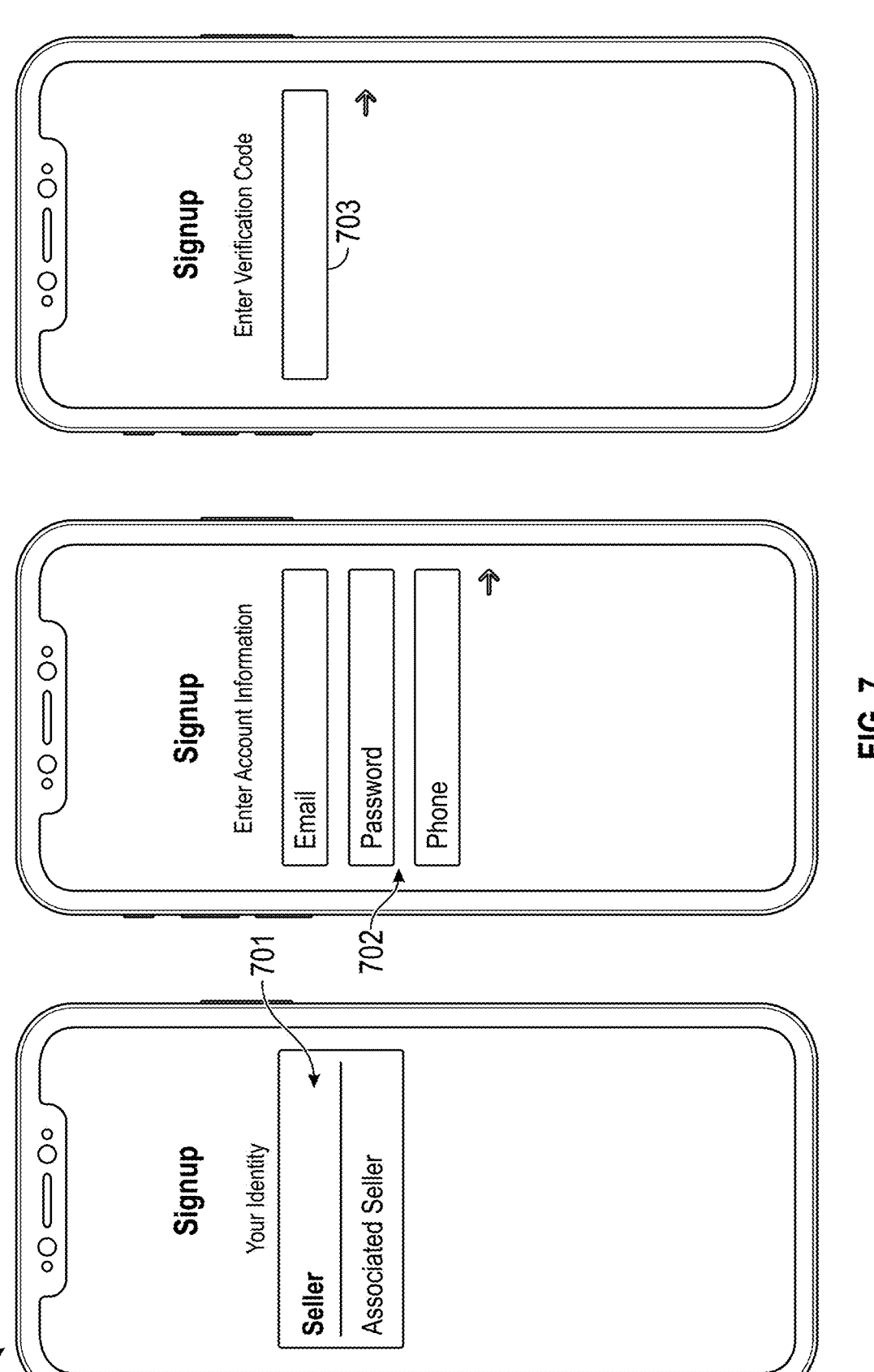
FIG. 7 shows example screenshots of a software application used for authenticating physical collectibles, highlighting an embodiment of a process whereby a seller can use government-issued identification and multi-factor authentication as a potential means of verifying seller's identity.
Figure 7:
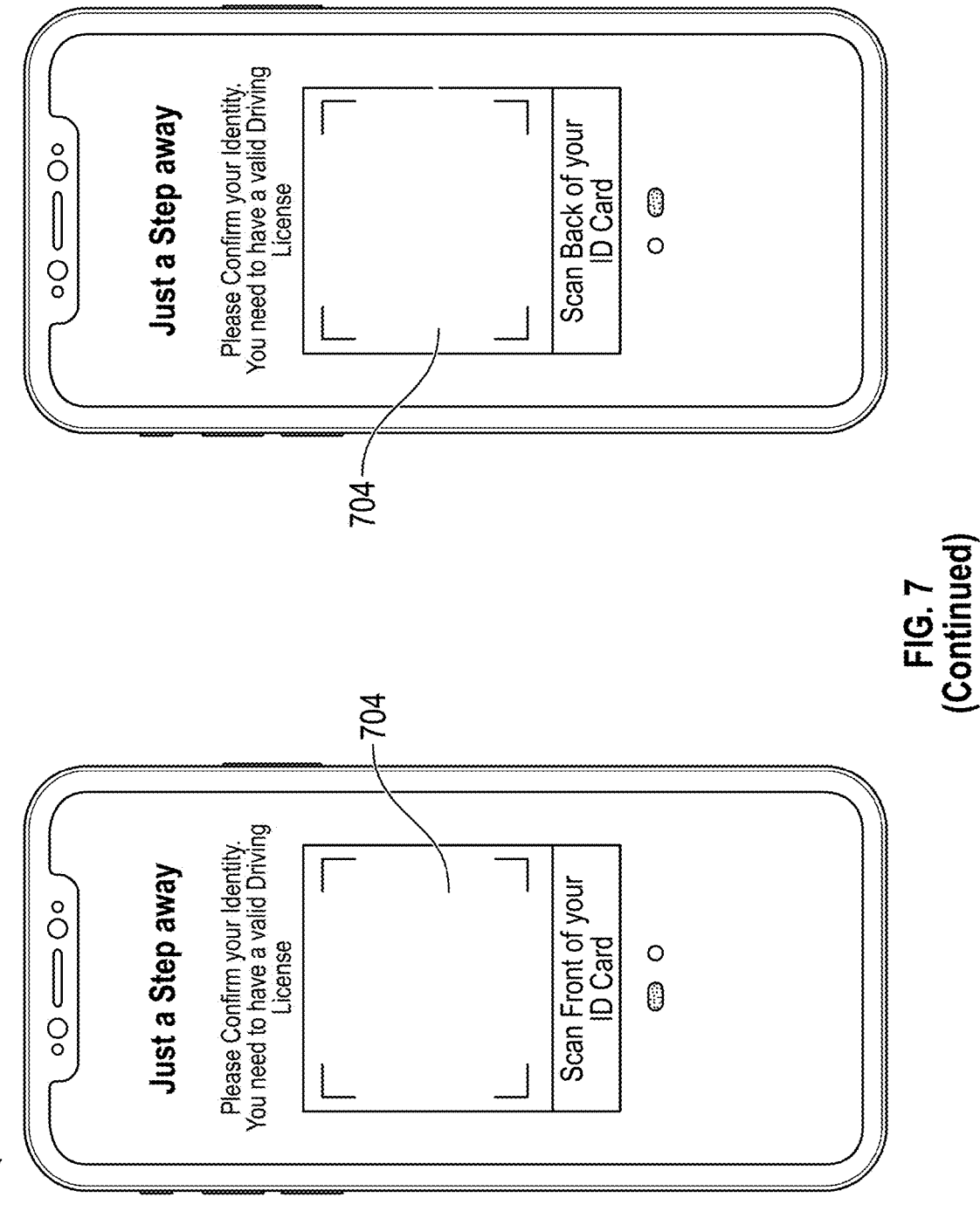

FIG. 7 shows example screenshots 700 of a software application, highlighting an embodiment of a process whereby a seller can use government-issued identification and multi-factor authentication as a potential means of verifying seller's identity. In an embodiment, the app may prompt the user to identify if they are a seller 701 or a seller's authorized agent (aka "Associated Seller"). If a user selects "Seller" the user may be prompted to enter account information, as shown in 702. As an additional form of verification, the system may use a form of multi-factor authentication. For example, the seller may be required to enter a code in the app, such code sent to seller from the system, as shown in 703. Per 704, the seller may be required to scan a form of government-issued identification, further verifying the identity of the seller, and associating the identity of the seller with the seller's phone.

FIG. 8 shows example screenshots 800 of a software application, highlighting an embodiment of a process whereby a seller can authorize other individuals to act on seller's behalf to authenticate physical collectibles. In an embodiment, it may be useful for a seller to have the option to authorize members of their team to assist in authentication of physical items. As shown in 801, 802, and 803 the app may facilitate the authorization and invitation processes for the seller to add authorized assistants. In certain situations, a seller may be a high-profile individual (e.g., an "A-list" celebrity) that may not have time or interest in spending much time to authenticate their items. In such a case, an authorized assistant for the seller may be helpful. In an embodiment of a process, a seller can authenticate the seller's items by themselves, without any witnesses. The seller may do so by using the app, and the front and rear facing cameras of their phone simultaneously. The app may be configured to allow a seller to use only the front-facing camera, or only the rear-facing camera as well. In another embodiment of a process, a seller's authorized assistant can you their own phone to capture the seller (for example, the "prominent" member of the seller's team—the individual with fame, followers, etc.). The app may be configured to allow the seller's authorized assistant to capture the seller and associate the seller with the seller's physical items by the authorized assistant using their own phone (with app installed) or by using the seller's app.

In another embodiment of a process, the seller's authorized assistant may authenticate the seller's items without the seller present at all. In this instance, it is likely that the value of the authenticated items will be less than if they were authenticated in the presence of the prominent seller. Nonetheless, the fact that the items were authenticated by an authorized assistant of the seller, and in some cases the capture of the authenticator's location and time may add to the value of the authenticated item(s). For example, if a seller is a musician, and the musician is on stage performing and simultaneously the seller's authorized assistant is using their own phone to authenticate one of the seller's guitars backstage, the app may capture the facts that: 1) the assistant is authorized to authenticate on behalf of the seller, 2) the assistant is at the location of the performance, and 3) the assistant is authenticating one of the seller's guitars at the same time the seller is performing on stage. Per 804, the app may be configured to include a dashboard, instructing a seller on how to add items.

Figure 9:
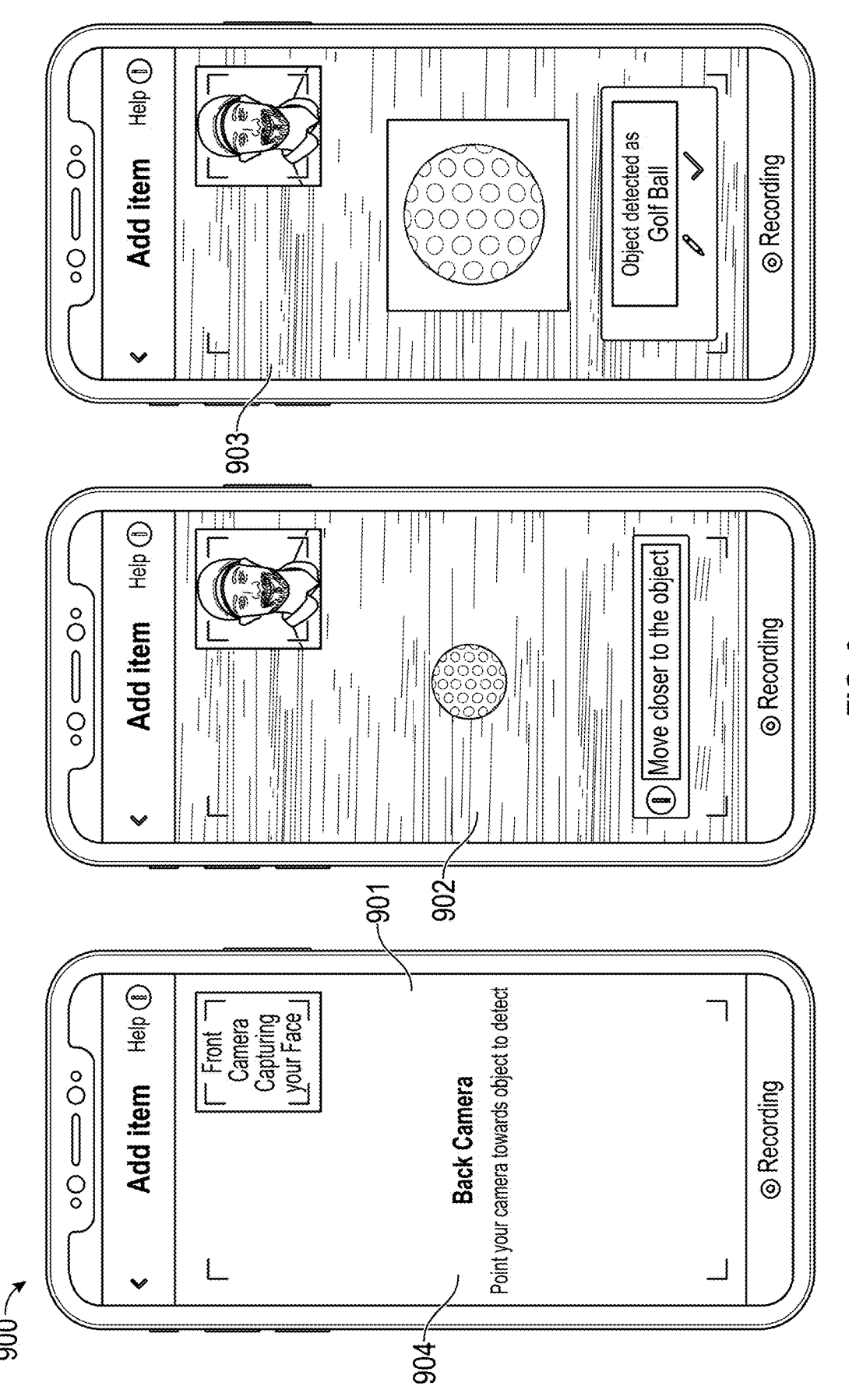
FIG. 9 shows example screenshots of a software application used for authenticating physical collectibles, highlighting an embodiment of a process whereby a seller associates/connects seller with physical items by using the forward and rear-facing cameras in a mobile phone, object recognition software, a system-generated unique code, and whereby seller describes physical items using voice recognition technology.
Figure 9:
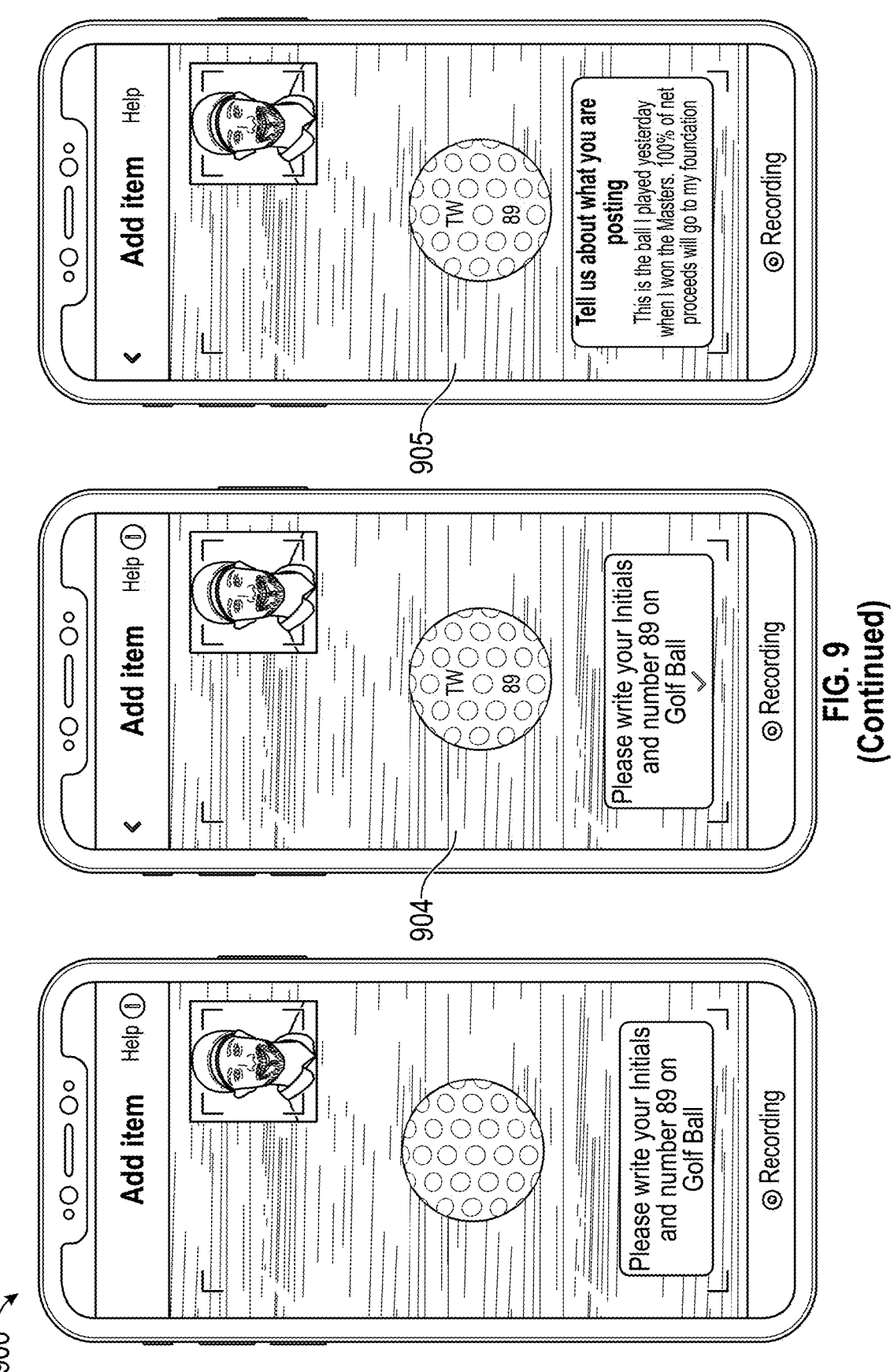

FIG. 9 shows example screenshots 900 of a software application, highlighting an embodiment of a process whereby a seller associates/connects seller with physical items by using the forward and rear-facing cameras in a mobile phone per 901 and 902. In an embodiment, object recognition software automatically identifies items per 903. In an embodiment, the system may determine sizing for shipping material based on such automated item recognition. A system-generated unique code is associated with each physical item. In an embodiment, to minimize friction associated with using the system and to allow a seller to start using the system upon hearing about it, a seller can authenticate physical items without the need of affixing coded physical tags to the item. Per 904, the app may be configured to instruct a seller to uniquely mark the physical item (e.g., write their initials somewhere on the item) and in an embodiment the app may instruct the seller to include a portion of the system-generated unique code (e.g., the last two digits of the code). In an embodiment, the seller can simply apply a unique marking without the need to write any digits from the unique code on the item. Per 905, the seller may describe the physical items using voice recognition technology.

Figure 10:
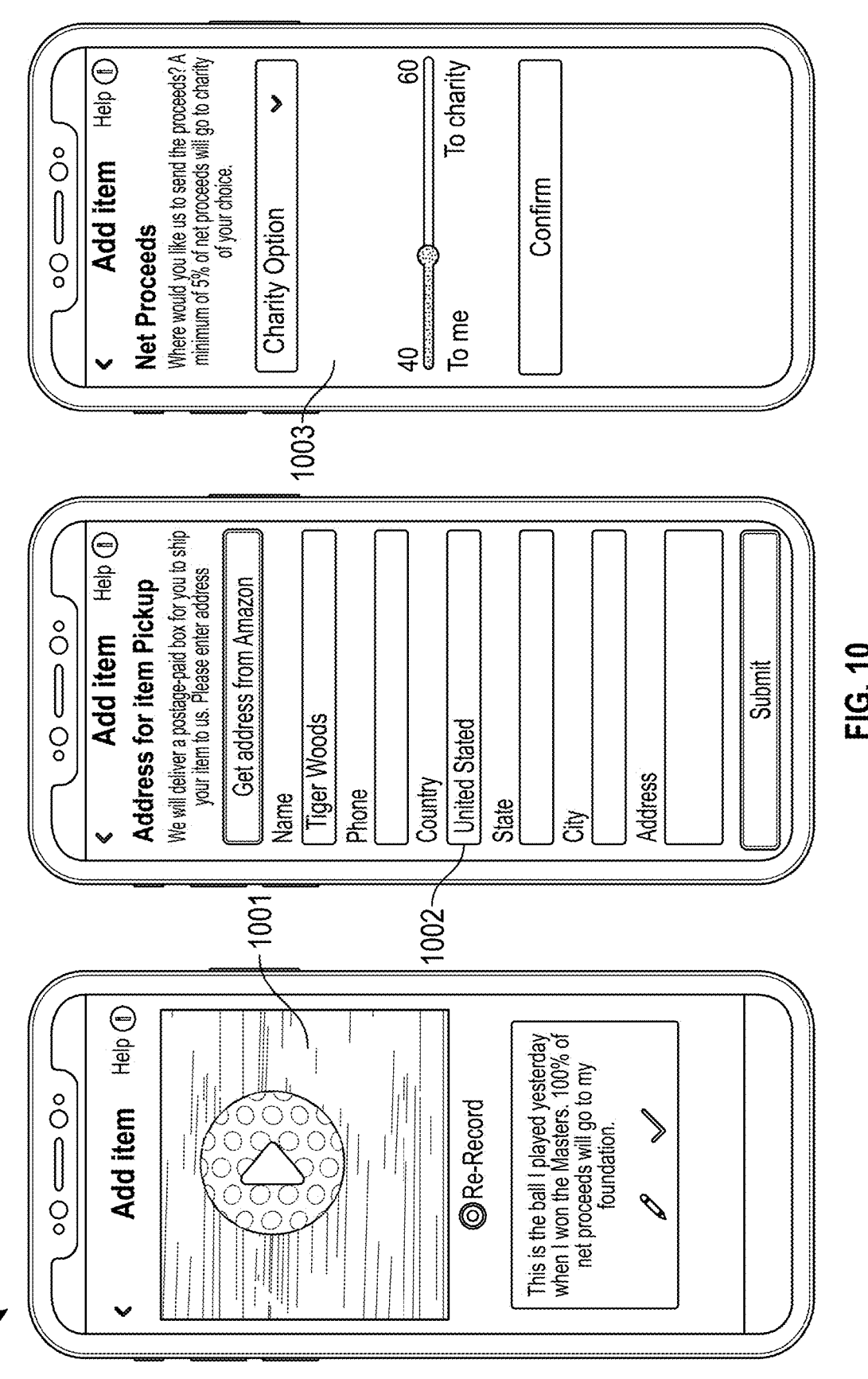
FIG. 10 shows example screenshots of a software application, highlighting an embodiment of a process whereby seller: 1) allocates the proceeds from a sale (e.g., to themselves, a charity, or a combination of the two) and 2) advertises the availability of a physical collectible(s) directly to seller's followers via the software application facilitating the sharing of links on social media, in accordance with an embodiment.
Figure 10:
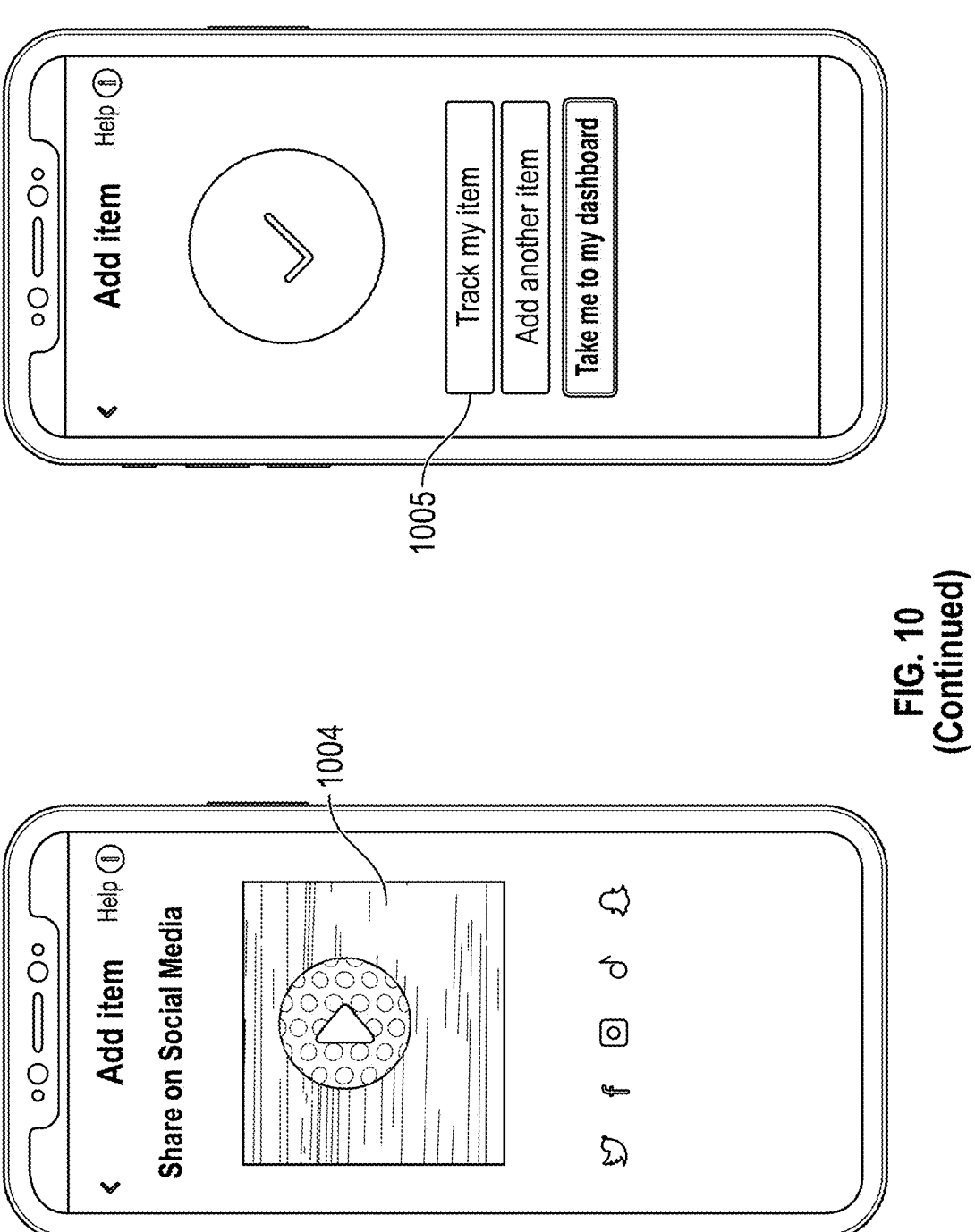

FIG. 10 shows example screenshots 1000 of a software application, highlighting an embodiment of a process whereby seller: 1) allocates the proceeds from a sale (e.g., to themselves, a charity, or a combination of the two) and 2) advertises the availability of a physical collectible(s) directly to seller's followers via the app facilitating the sharing of links on social media. Per 1001, the app may be configured to allow a seller to re-record their description of the physical item. Per 1002, the app may be configured to allow a seller to enter the location of the physical item(s), for pickup and delivery. Per 1003, the seller may allocate the net proceeds from a sale (e.g., to themselves, a charity, or a combination of the two). Per 1004, the app may be configured to advertise the availability of a physical collectible(s) directly to seller's followers by sharing links to the seller's recorded video (i.e., the video authenticating physical items in the app) on social media. Per 1005, the app may be configured to allow a seller to track items listed for auction or sweepstakes, add items, see a dashboard, etc.

Figure 11:
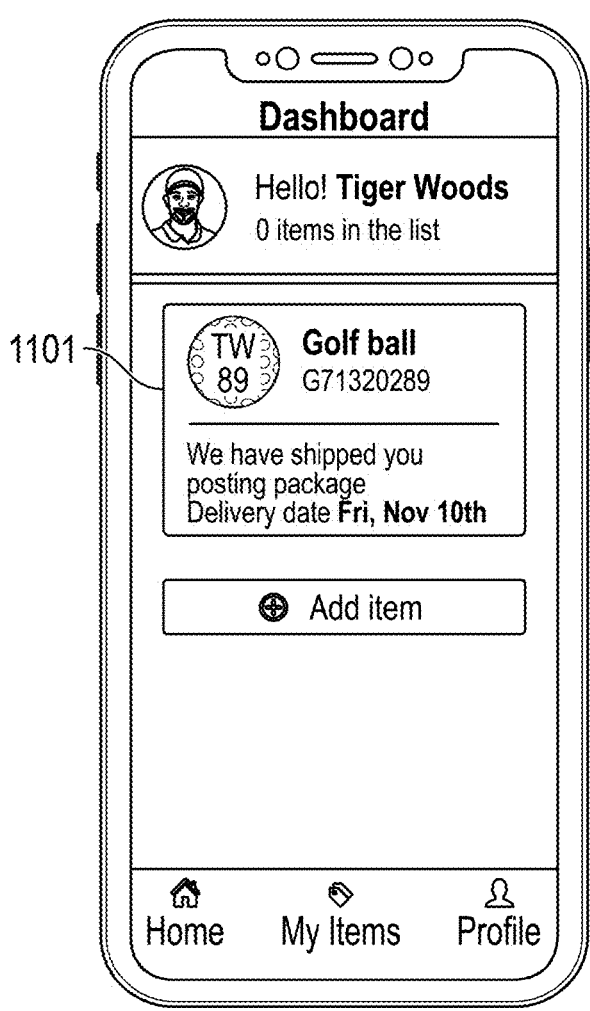
FIG. 11 shows an example screenshot of a software application used for authenticating physical collectibles, highlighting a dashboard view, in accordance with an embodiment.

FIG. 11 shows an example screenshot 1100 of a software application, highlighting a dashboard view and per 1101 the app may be configured to display physical item images, descriptions, and delivery tracking information.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
initiating, by one or more processors of a mobile device, a session within a software application to authenticate a user of the mobile device and a physical item being copresent during the session;
displaying, by a display of the mobile device, a prompt to the user to make a unique marking on the physical item;
capturing, during the session by one or more cameras of the mobile device, an image of the physical item having the unique marking made by the user on the physical item in response to the displayed prompt;
generating, during the session by the one or more processors, session data representing presence of the mobile device and the user, wherein the session data includes user image data, real-time clock data generated by the one or more processors during the session, and GPS coordinates of the mobile device during the session; and
generating, by the one or more processors based on the image and the session data, an authentication asset including a unique code associated with the unique marking on the physical item to represent the presence of both the user and the physical item during the session.

2. The method of claim 1, wherein the authentication asset includes a superimposed image including the unique code superimposed on the image of the physical item.

3. The method of claim 1 further comprising displaying, by the display of the mobile device, instructions to apply the unique marking to the physical item.

4. The method of claim 1 further comprising capturing, by the one or more cameras simultaneously with capturing the image, a second image of the user of the mobile device.

5. The method of claim 4, wherein the one or more cameras include a first camera and a second camera, and wherein the first camera captures the image and the second camera captures the second image.

6. The method of claim 1 further comprising generating, by the one or more processors, descriptive data describing the physical item.

7. The method of claim 6, wherein generating the descriptive data includes identifying the physical item based on image recognition of the physical item in the image.

8. The method of claim 1, wherein the prompt includes one or more characters of the unique marking to be made on the physical item, and wherein the unique code includes the one or more characters.

9. The method of claim 8, wherein the one or more characters include a sequence of two or more characters, and wherein the unique code includes the sequence of two or more characters.

10. The method of claim 1 further comprising:
transmitting, by the one or more processors, the image to a remote server; and
comparing, by one or more server processors of the remote server, the image to the unique marking on the physical item to authenticate the physical item as being the physical item in the image.

11. A non-transitory computer readable medium storing instructions which, when executed by one or more processors of a mobile device, cause the mobile device to perform a method comprising:
initiating, by the one or more processors of the mobile device, a session within a software application to authenticate a user of the mobile device and a physical item being copresent during the session;
displaying, by a display of the mobile device, a prompt to the user to make a unique marking on the physical item;
capturing, during the session by one or more cameras of the mobile device, an image of a physical item having the unique marking made by the user on the physical item in response to the displayed prompt;
generating, during the session by the one or more processors, session data representing presence of the mobile device and the user, wherein the session data includes user image data, real-time clock data generated by the one or more processors during the session, and GPS coordinates of the mobile device during the session; and
generating, by the one or more processors based on the image and the session data, an authentication asset including a unique code associated with the unique marking on the physical item to represent the presence of both the user and the physical item during the session.

12. The non-transitory computer readable medium of claim 11, wherein the authentication asset includes a super-imposed image including the unique code superimposed on the image of the physical item.

13. The non-transitory computer readable medium of claim 11 further comprising displaying, by the display of the mobile device, instructions to apply the unique marking to the physical item.

14. The non-transitory computer readable medium of claim 11 further comprising capturing, by the one or more cameras simultaneously with capturing the image, a second image of the user of the mobile device.

15. The non-transitory computer readable medium of claim 11 further comprising generating, by the one or more processors, descriptive data describing the physical item.

16. A mobile device, comprising:

a display to display a prompt to a user to make a unique marking on a physical item during a session;

one or more cameras to capture an image of the physical item having the unique marking made by the user on the physical item during the session in response to the displayed prompt; and one or more processors to:

initiate the session within a software application to authenticate the user of the mobile device and the physical item being copresent during the session, generate session data representing presence of the mobile device and the user during the session, wherein the session data includes user image data, real-time clock data generated by the one or more processors during the session, and GPS coordinates of the mobile device during the session, and generate, based on the image and the session data, an authentication asset including a unique code associated with the unique marking on the physical item to represent the presence of both the user and the physical item during the session.

17. The mobile device of claim 16, wherein the authentication asset includes a superimposed image including the unique code superimposed on the image of the physical item.

18. The mobile device of claim 16 further comprising the display to display instructions to apply the unique marking to the physical item.

19. The mobile device of claim 16, wherein the one or more cameras are further to capture, simultaneously with capturing the image, a second image of the user of the mobile device.

20. The mobile device of claim 16, wherein the one or more processors are further to generate descriptive data describing the physical item.

\* \* \* \* \*